US 9,567,472 B2

(12) United States Patent
Wu et al.

(10) Patent No.: US 9,567,472 B2
(45) Date of Patent: Feb. 14, 2017

(54) PHASE CHANGE INK FOR OPHTHALMIC LENS MARKING

(71) Applicant: Xerox Corporation, Norwalk, CT (US)

(72) Inventors: Bo Wu, Wilsonville, OR (US); Jule W. Thomas, Jr., West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/569,674

(22) Filed: Dec. 13, 2014

(65) Prior Publication Data

US 2016/0168404 A1    Jun. 16, 2016

(51) Int. Cl.
| C09D 11/34 | (2014.01) |
| C09D 11/08 | (2006.01) |
| C09D 11/12 | (2006.01) |
| C09D 11/322 | (2014.01) |
| C09D 11/328 | (2014.01) |
| G02C 7/02 | (2006.01) |

(52) U.S. Cl.
CPC .............. C09D 11/34 (2013.01); C09D 11/08 (2013.01); C09D 11/12 (2013.01); C09D 11/322 (2013.01); C09D 11/328 (2013.01); G02C 7/021 (2013.01)

(58) Field of Classification Search
CPC ..................................................... C09D 11/34
See application file for complete search history.

(56) References Cited

U.S. PATENT DOCUMENTS

| 5,195,430 A | 3/1993 | Rise |
| 5,389,958 A | 2/1995 | Bui et al. |
| 5,593,486 A * | 1/1997 | Oliver et al. ............. 524/96 |
| 6,590,082 B1 | 7/2003 | Banning et al. |
| 6,858,070 B1 | 2/2005 | Wong et al. |
| 6,860,930 B2 | 3/2005 | Wu et al. |
| 7,973,186 B1 | 7/2011 | Goredema et al. |
| 2007/0119338 A1* | 5/2007 | Breton et al. ............. 106/31.29 |
| 2010/0130657 A1* | 5/2010 | Drappel et al. ............. 524/196 |

OTHER PUBLICATIONS

Bo Wu, et al., U.S. Appl. No. 14/569,675, filed Dec. 13, 2014, "White Phase Change Ink Composition," not yet published.
Bo Wu, et al., U.S. Appl. No. 14/569,676, filed Dec. 13, 2014, "Water Cleanable Phase Change Ink for Ophthalmic Lens Marking," not yet published.
Bo Wu, et al., U.S. Appl. No. 14/569,678, filed Dec. 13, 2014, "Water Dispersible Phase Change Ink Suitable for Use As a Photo-Mask," not yet published.
Océ TonerPearls® Material Safety Data Sheet, 2 pages, May 2008.

* cited by examiner

*Primary Examiner* — Veronica F Faison
(74) *Attorney, Agent, or Firm* — Marylou J. Lavoie, Esq. LLC

(57) ABSTRACT

A phase change ink composition for printing on ophthalmic lenses including a straight chain hydrocarbon wax and a branched hydrocarbon wax; an amide, wherein the amide is present in an amount of greater than about 25 percent by weight based on the total weight of the ink composition; a rosin ester; and a colorant. A phase change ink composition for printing on ophthalmic lenses including a straight chain hydrocarbon wax and a branched hydrocarbon wax; an amide, wherein the amide comprises a combination of at least two members of the group consisting of monoamide, triamide, and tetra-amide; a rosin ester; and a colorant. An ink jet printer stick or pellet comprising the phase change ink composition.

20 Claims, No Drawings

PHASE CHANGE INK FOR OPHTHALMIC LENS MARKING

TECHNICAL FIELD

Described herein are phase change inks suitable for use with ophthalmic lenses. More particularly described is a phase change ink composition for printing on ophthalmic lenses comprising a straight chain hydrocarbon wax and a branched hydrocarbon wax; an amide, wherein the amide is present in an amount of greater than about 25 percent by weight based on the total weight of the ink composition; a rosin ester; and a colorant.

BACKGROUND

Disclosed herein is a phase change ink suitable for printing on ophthalmic lenses. Ophthalmic lenses have been produced as semi-finished lens by bulk lens manufacturers and then distributed to individual laboratories to prepare the finished lens. Traditionally, label information for each semi-finished lens was provided by printing the relevant information on a paper envelop for each lens.

Recently, lenses have been labeled by using a phase change ink to print the relevant information directly onto the lens using a digital printer. However, current known phase change ink can exhibit performance issues for lens labeling applications including clogging of printer heads. Further performance issues include the need for jetting reliability, durability of the printed image on the lens, the need for printed images that are removable from the lens when no longer needed thereon, and the need for printed images on the lens that are of good print quality.

A need remains for an improved phase change ink suitable for printing on ophthalmic lenses. Further, a need remains for an improved phase change ink suitable for printing on ophthalmic lenses which have improved jetting reliability, improved durability after printing on lenses, provide printed images which are easy to clean and provide good adhesion on both hydrophilic and hydrophobic lenses, and which provide good optical contrast on both clear and dark lenses.

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition for printing on ophthalmic lenses comprising a straight chain hydrocarbon wax and a branched hydrocarbon wax; an amide, wherein the amide is present in an amount of greater than about 25 percent by weight based on the total weight of the ink composition; a rosin ester; and a colorant.

Also described is a phase change ink composition for printing on ophthalmic lenses comprising a straight chain hydrocarbon wax and a branched hydrocarbon wax; an amide, wherein the amide comprises a combination of at least two members of the group consisting of monoamide, triamide, and tetra-amide; a rosin ester; and a colorant.

Also described is an ink jet printer stick or pellet comprising a phase change ink composition for printing on ophthalmic lenses, the phase change ink composition comprising a straight chain hydrocarbon wax and a branched hydrocarbon wax; an amide, wherein the amide is present in an amount of greater than about 25 percent by weight based on the total weight of the ink composition; a rosin ester; and a colorant; or the phase change ink composition comprising a straight chain hydrocarbon wax and a branched hydrocarbon wax; an amide, wherein the amide comprises a combination of at least two members of the group consisting of monoamide, triamide, and tetra-amide; a rosin ester; and a colorant.

DETAILED DESCRIPTION

A phase change ink composition is provided which is particularly suitable for printing on ophthalmic lenses. In embodiments, the phase change ink composition provides improved jetting reliability, improved durability of the printed image after printing on lenses, printed images on the lenses which are easy to clean and provide good adhesion on both hydrophilic and hydrophobic lenses, and good optical contrast on both clear and dark lenses. The phase change ink compositions provide robust printed images on lenses and remain robust and intact images during lens shipment but can be readily removed post-shipment as desired.

In embodiments, a phase change ink composition for printing on ophthalmic lenses comprises a straight chain hydrocarbon wax and a branched hydrocarbon wax; an amide, wherein the amide is present in an amount of greater than about 25 percent by weight based on the total weight of the ink composition; a rosin ester; and a colorant.

In other embodiments, a phase change ink composition for printing on ophthalmic lenses comprises a straight chain hydrocarbon wax and a branched hydrocarbon wax; an amide, wherein the amide comprises a combination of at least two members of the group consisting of monoamide, triamide, and tetra-amide; a rosin ester; and a colorant.

Hydrocarbon Wax.

The phase change ink compositions include a combination of straight chain hydrocarbon wax and branched hydrocarbon wax. Straight chain hydrocarbon wax has been employed in traditional ink. Traditional inks do not include branched hydrocarbon wax. Branched hydrocarbon wax, which is soft, has been avoided due to requirements related to transfix performance, hardening, and other mechanical performance requirements. The phase change ink compositions herein include a combination of both straight chain and branched hydrocarbon wax. In contrast to offset or indirect printing processes, directing printing processes are provided herein for printing the ink of the present disclosure directly onto the lens without the need for transfix processes. Therefore, the relatively soft, branched hydrocarbon wax is employed to provide good adhesion and improved scratch resistance to the printed image.

Any suitable or desired straight chain hydrocarbon wax can be selected for the phase change ink compositions herein. In embodiments, the straight chain hydrocarbon wax is a hydrocarbon based wax, such as the homopolymers of polyethylene available from Baker Petrolite and of the general formula

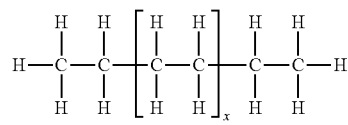

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110° C., POLYWAX 655 (Mn about 655), distilled POLY-WAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLY-WAX 1000 (Mn about 1,000), and the like.

In specific embodiments, the straight chain hydrocarbon wax comprises a straight chain polyethylene wax.

In embodiments, the branched hydrocarbon wax comprises a branched polyethylene wax, a branched polymethylene wax, or a combination thereof. For example, suitable branched hydrocarbon waxes include those available under the tradename Microsere®, such as Microsere® 5714 branched microcrystalline wax commercially available from The International Group, Inc. (IGI).

In embodiments, the branched hydrocarbon wax comprises a branched polyethylene wax, a branched polymethylene wax, or a mixture or combination thereof.

The hydrocarbon wax can be present in the phase change ink composition in any suitable or desired amount. In embodiments, the straight chain hydrocarbon wax is present in an amount of from about 15 to about 75 percent by weight, or from about 20 to about 60 percent by weight, or from about 25 to about 50 percent by weight, based upon the total weight of the phase change ink composition.

In embodiments, the branched hydrocarbon wax is present in an amount of from about 15 to about 60 percent by weight, or from about 20 to about 55 percent by weight, or from about 25 to about 50 percent by weight, based upon the total weight of the phase change ink composition.

In embodiments, the combined total amount of all hydrocarbon wax present in the phase change, including both the straight chain and branched hydrocarbon wax along with any additional optional other wax, is from about 15 to about 75 percent by weight, or from about 20 to about 70 percent by weight, or from about 25 to about 60 percent by weight, based upon the total weight of the phase change ink composition.

Amide.

The phase change ink compositions herein include a combination of branched and straight chain hydrocarbon wax and at least one amide. In embodiments, the phase change ink compositions herein include a combination of branched and straight chain hydrocarbon wax and a large amount of amide, in embodiments the large amount of amide meaning the amide is present in the phase change ink composition in an amount of greater than about 25 percent by weight based on the total weight of the phase change ink composition. In embodiments, the amide is present in the phase change ink composition in an amount of greater than about 25 percent to about 75 percent, or from about 26 to about 65, or from about 27 to about 55 percent by weight based on the total weight of the phase change ink composition.

In embodiments a phase change ink composition herein comprises a combination of straight chain hydrocarbon wax and branched hydrocarbon wax; an amide, wherein the amide comprise a combination of at least two members of the group consisting of monoamide, triamide, and tetra-amide; a rosin ester; and a colorant. In certain embodiments wherein the amide comprises a combination of at least two members of the group consisting of monoamide, triamide, and tetra-amide, the total amount of amide present in the phase change ink composition comprises greater than about 25 percent total amide, or from greater than about 25 percent to about 75 percent, or from about 25 to about 75 percent, or from about 26 to about 65, or from about 27 to about 55 percent total amide, by weight based on the total weight of the phase change ink composition.

Any suitable or desired amide can be selected. In embodiments, the phase change ink composition comprises a fatty amide. The fatty amide can be any suitable or desired fatty amide. In embodiments, fatty amides herein include monoamides, tetra-amides, mixtures thereof, and the like, for example such as described in U.S. Pat. No. 6,858,070, which is hereby incorporated herein by reference.

In embodiments, the amide comprises a monoamide, a triamide, a tetra-amide, or a mixture thereof. In embodiments, the amide comprise a combination of monoamide, triamide, and tetra-amide. Suitable monoamides may have a melting point of at least about 50° C., for example from about 50° C. to about 150° C., although the melting point can be outside these ranges. Specific examples of suitable monoamides include, for example, primary monoamides and secondary monoamides. Stearamide, such as KEMAMIDE® S available from Chemtura Corporation and CRODAMIDE® S available from Croda, behenamide/arachidamide, such as KEMAMIDE® B available from Chemtura Corporation and CRODAMIDE® BR available from Croda, oleamide, such as KEMAMIDE® U available from Chemtura Corporation and CRODAMIDE® OR available from Croda, technical grade oleamide, such as KEMAMIDE® O available from Chemtura Corporation, CRODAMIDE® O available from Croda, and UNISLIP® 1753 available from Uniqema, and erucamide such as KEMAMIDE® E available from Chemtura Corporation and CRODAMIDE® ER available from Croda, are some examples of suitable primary amides. Behenyl behenamide, such as KEMAMIDE® EX666 available from Chemtura Corporation, stearyl stearamide, such as KEMAMIDE® S-180 and KEMAMIDE® EX-672 available from Chemtura Corporation, stearyl erucamide, such as KEMAMIDE® E-180 available from Chemtura Corporation and CRODAMIDE® 212 available from Croda, erucyl erucamide, such as KEMAMIDE® E-221 available from Chemtura Corporation, oleyl palmitamide, such as KEMAMIDE® P-181 available from Chemtura Corporation and CRODAMIDE® 203 available from Croda, and erucyl stearamide, such as KEMAMIDE® S-221 available from Chemtura Corporation, are some examples of suitable secondary amides. Additional suitable amide materials include KEMAMIDE® W40 (N,N'-ethylenebisstearamide), KEMAMIDE® P181 (oleyl palmitamide), KEMAMID®E W45 (N,N'-ethylenebisstearamide), and KEMAMIDE® W20 (N,N'-ethylenebisoleamide).

In embodiments, the amide can comprises a branched triamide. Branched triamides are disclosed in, for example, U.S. Pat. No. 6,860,930, the disclosure of which is totally incorporated herein by reference. By "branched triamide" is meant that the structure of the triamide can be drawn so that each amide group is bonded to an atom or group of atoms contained in a branch other than that of the others, and that each amide group is in a different branch. By "each amide group is in a different branch" is meant that the triamide is not linear; by "linear" is meant a molecule wherein all three amide groups can be drawn as being in the same molecular chain or branch, such as linear triamides of the formulae

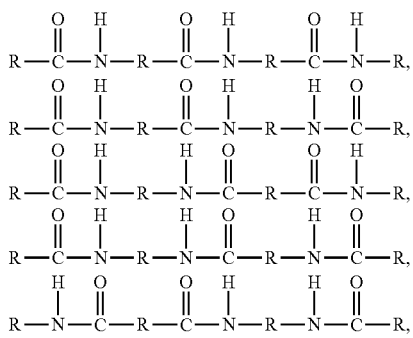

or the like. For purposes of the present invention, linear triamides include those wherein a line can be drawn through the three amide groups, even if one would ordinarily draw a different line. For example, a compound of the formula

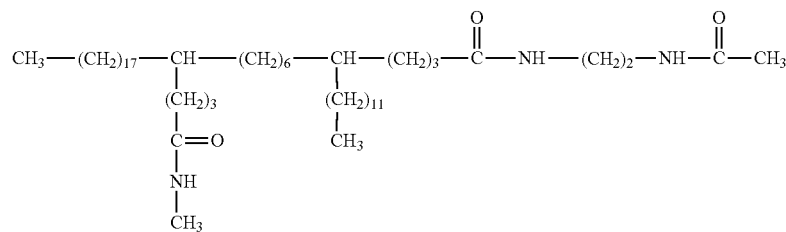

is considered a linear compound for purposes of the present invention, because it can also be drawn as follows:

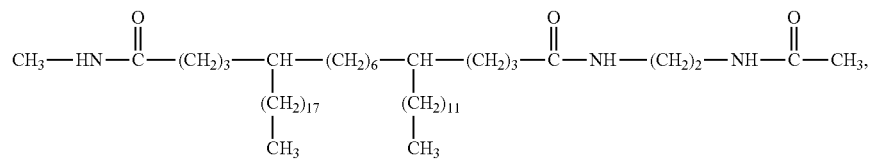

and accordingly would not be considered to be a branched triamide for the purposes of the inks discloses herein. For purposes of the inks disclosed herein, "branched triamines", "branched triacids", "branched monoamino diacids", and "branched diamino monoacids" have similar definitions in that each of the three functional groups named can be drawn as being in a different branch from the other two.

Examples of suitable branched triamides include (but are not limited to) those generated from branched triamines, said branched triamides being of the formula

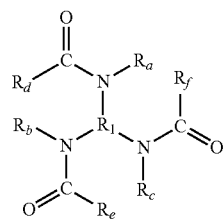

wherein $R_1$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), having from about 3 to about 200 carbon atoms, (ii) an arylene group (including unsubstituted and substituted arylene groups, and wherein hetero atoms, as described above may optionally be present in the arylene group), having from about 6 to about 200 carbon atoms, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, as described above may optionally be present in either or both of the alkyl portion and the aryl portion of the arylalkylene group), having from about 7 to about 200 carbon atoms, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, as described above may optionally be present in either or both of the alkyl portion and the aryl portion of the alkylarylene group), having from about 7 to about 200 carbon atoms, such as tolylene or the like, $R_a$, $R_b$, and $R_c$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as described above may optionally be present in the alkyl group), having from 1 carbon atom to about 200 carbon atoms, (iii) an aryl group (including unsubstituted and substituted aryl groups, and wherein hetero atoms, such as described above may optionally be present in the aryl group), having from 6 to about 200 carbon atoms, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as described above may optionally be present in either or both of the alkyl portion and the aryl portion of the arylalkyl group), having from 6 to about 200 carbon atoms, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as described above may optionally be present in either or both of the alkyl portion and the aryl portion of the alkylaryl group), having 6 to about 200 carbon atoms, such as tolyl or the like, Rd, Re, and Rf each, independently of the others, is (i) an alkyl group (including linear, branched, saturated, unsaturated, cyclic, acyclic, substituted, and unsubstituted alkyl groups, and wherein hetero atoms, such as described above may optionally be present in the alkyl group), having 1 to about 200 carbon atoms, (ii) an aryl group (including unsubstituted and substituted aryl groups, and wherein hetero atoms, such as described above may optionally be present in the aryl group), having 6 to about 200 carbon atoms, (iii) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as described above may optionally be present in either or both of the alkyl portion and the aryl portion of the arylalkyl group), having 6 to about 200 carbon atoms, such as benzyl or the like, or (iv) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as described above may optionally be present in either or both of the alkyl portion and the aryl portion of the alkylaryl group), having 6 to about 200 carbon atoms, such as tolyl or the like, those generated from branched triacids, said branched triamides being of the formula

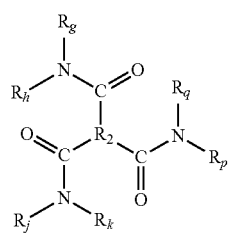

wherein $R_2$ is (i) an alkylene group as described for $R_1$ above, Rg, Rj, and Rp each, independently of the others, is (i) a hydrogen atom, (ii) an alkyl group (including linear, branched, saturated, unsaturated, cyclic, acyclic, substituted, and unsubstituted alkyl groups, and wherein hetero atoms may optionally be present in the alkyl group), having 1 to about 200 carbon atoms, (iii) an aryl group (including unsubstituted and substituted aryl groups, and wherein hetero atoms may optionally be present in the aryl group), having 10 to about 200 carbon atoms, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms may optionally be present in either or both of the alkyl portion and the aryl portion of the arylalkyl group), having 7 to about 200 carbon atoms, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms may optionally be present in either or both of the alkyl portion and the aryl portion of the alkylaryl group), having 7 to about 200 carbon atoms, such as tolyl or the like, Rh, Rk, and Rq each, independently of the others, is (i) a hydrogen atom, (ii) an alkyl group (including linear, branched, saturated, unsaturated, cyclic, acyclic, substituted, and unsubstituted alkyl groups, and wherein hetero atoms may optionally be present in the alkyl group), having 1 to about 200 carbon atoms, (iii) an aryl group (including unsubstituted and substituted aryl groups, and wherein hetero atoms may optionally be present in the aryl group), having 6 to about 200 carbon atoms, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms may optionally be present in either or both of the alkyl portion and the aryl portion of the arylalkyl group), having 7 to about 200 carbon atoms such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms may optionally be present in either or both of the alkyl portion and the aryl portion of the alkylaryl group), having 7 to about 200 carbon atoms, such as tolyl or the like, those generated from branched diamino monoacid compounds, said branched triamides being of the formula

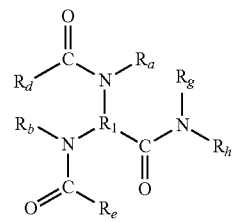

wherein $R_1$, Ra, Rb, Rd, Re, Rg, and Rh are as defined hereinabove, those generated from branched monoamino diacid compounds, said branched triamides being of the formula

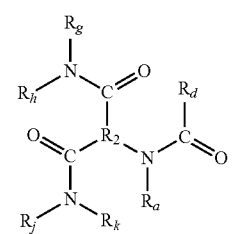

wherein $R_2$, Ra, Rd, Rg, Rh, Rj, and Rk are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula

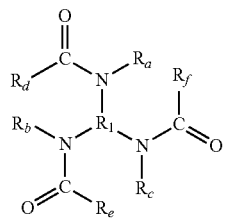

the total number of carbon atoms in $R_1+Ra+Rb+Rc+Rd+Re+Rf$ is 7 to no more than about 500. In another specific embodiment, each of Ra, Rd, Rb, Re, Rc, and Rf, independently of the others, has no more than about 50 carbon atoms, and in yet another specific embodiment no more than about 48 carbon atoms, although the number of carbon atoms can be outside of these ranges.

In one specific embodiment, when the triamide is of the formula

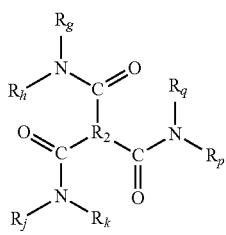

the total number of carbon atoms in $R_2+Rg+Rh+Rj+Rk+Rp+Rq$ is about 7 to no more than about 500. In another specific embodiment, each of Rg, Rh, Rj, Rk, Rp, and Rq, independently of the others, has no more than about 50 carbon atoms, and in yet another specific embodiment no more than about 48 carbon atoms, although the number of carbon atoms can be outside of these ranges.

In one specific embodiment, when the triamide is of the formula

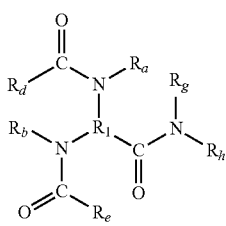

the total number of carbon atoms in $R_1+Ra+Rb+Rd+Re+Rg+Rh$ is about 7 to no more than about 500. In another specific embodiment, each of Ra, Rd, Rb, Re, Rg, and Rh, independently of the others, has no more than about 50 carbon atoms, and in yet another specific embodiment no more than about 48 carbon atoms, although the number of carbon atoms can be outside of these ranges.

In one specific embodiment, when the triamide is of the formula

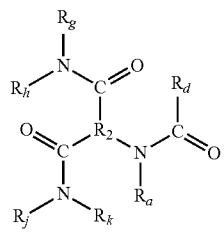

the total number of carbon atoms in $R_2+Ra+Rd+Rg+Rh+Rj+Rk$ is about 7 to no more than about 500. In another specific embodiment, each of Ra, Rd, Rg, Rh, Rj, and Rk, independently of the others, has no more than about 50 carbon atoms, and in yet another specific embodiment no more than about 48 carbon atoms, although the number of carbon atoms can be outside of these ranges.

It must be emphasized that not all of the amide groups in the first formula need to be directly bonded to the same atom in the $R_1$ or $R_2$ group, and in one specific embodiment, each amide group is bonded to a different atom in the $R_1$ or $R_2$ group.

In one specific embodiment, the branched triamide is of the formula

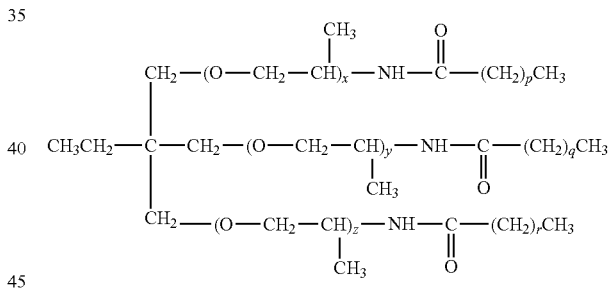

wherein x, y, and z each, independently represent the number of propyleneoxy repeat units and x+y+z is from about 5 to about 6, and wherein p, q, and r each, independently of the others, are integers representing the number of repeat —$(CH_2)$— units and are from about 15 to about 60. The triamide composition is frequently obtained as a mixture of materials, wherein p, q, and r are each peak average chain length numbers within the composition, rather than uniform compositions wherein each molecule has the same value for p, q, and r, and it must be understood that within the mixture, some individual chains may be longer or shorter than the given numbers.

A triamide wax can be prepared as described in Example II of U.S. Pat. No. 6,860,930, is prepared as follows. To a 1,000 milliliter four-neck round bottom flask fitted with a Trubore stirrer, $N_2$ inlet, Dean-Stark trap with condenser and $N_2$ outlet and thermocouple-temperature controller was added 350.62 grams (0.3675 moles) of UNICID® 550 (a mono-acid obtained from Baker-Petrolite Corp., Cincinnati, Ohio, of the formula $CH_3(CH_2)_nCOOH$, wherein n has an average value of about 37 and is believed to have a range of from about 34 to about 40) and 0.79 grams of NAUGARD® 524 (antioxidant obtained from Uniroyal Chemical Company, Inc., Middlebury, Conn.). The mixture was heated to 115° C. to melt, and stirred at atmospheric pressure under $N_2$. 51.33 grams (0.1167 moles) of JEFFAMINE® T-403 (mixture of triamines obtained from Huntsman Corporation, Houston, Tex., of the formula

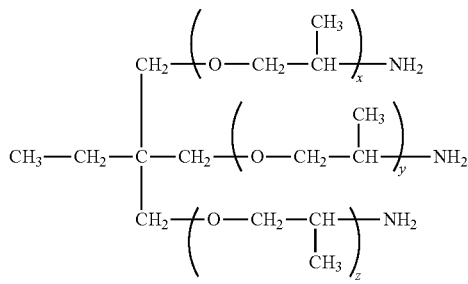

wherein x, y, and z are each integers representing the number of repeat propyleneoxy units, wherein x, y, and z may each be zero, and wherein the sum of x+y+z is from about 5 to about 6) was then added to the reaction mixture, and the reaction temperature was increased to 200° C. gradually over 0.5 hour and held at that temperature for another 3 hours. Some water was carried out by slow blowing $N_2$ and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

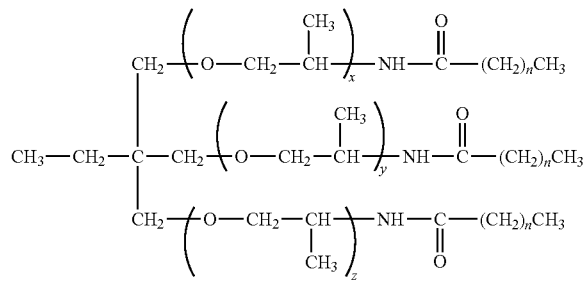

wherein n, x, y, and z are as defined hereinabove.

In a specific embodiment, the amide selected is a triamide. The triamide can provide the feature of low viscosity compared to using a tetra-amide for the same molecular weight.

Rosin Ester.

The phase change ink composition comprises a rosin ester. The rosin ester can be any suitable or desired rosin ester, including mixtures thereof. In embodiments, the rosin ester comprises glyceryl abietate. Specific examples of suitable rosin ester resins include PINECRYSTAL® KE-100, glycerol abietate, commercially available from Arakawa, and the like.

The rosin ester resin is present in the ink composition in any desired or effective amount. In embodiments, the rosin ester is present in the phase change ink composition in an amount of from about 0.5 percent to about 20 percent, or from about 2 percent to about 15 percent, or from about 3 percent to about 10 percent, by weight based upon the total weight of the ink composition.

Colorant.

The phase change ink composition comprises a colorant. Any suitable or desired colorant including dyes, pigments, and mixtures and combinations thereof can be selected. In embodiments, the colorant is selected from the group consisting of dyes, pigments, and mixtures and combinations thereof. In specific embodiments, the colorant is a dye. In other embodiments, the colorant is a pigment. In certain embodiments, the colorant is a yellow dye. In certain other embodiments, the colorant is a blue dye.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN (Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

The colorant is present in the ink in any desired or effective amount, in embodiments the colorant is present in an amount of from about 1 to about 60 percent, or from about 30 to about 40 percent, or from about 10 to about 25 percent by weight based upon the total weight of the ink.

Other Additives.

The ink may further include conventional additives to take advantage of the known functionality associated with such conventional additives. Such additives may include, for example, at least one antioxidant, defoamer, slip and leveling agents, clarifier, viscosity modifier, adhesive, plasticizer and the like. In embodiments, the phase change ink composition includes a member of the group consisting of plasticizer, stabilizer, antioxidant, defoamer, slip and leveling agents, clarifier, viscosity modifier, adhesive, and mixtures and combinations thereof.

The ink may optionally contain antioxidants to protect the images from oxidation and also may protect the ink components from oxidation while existing as a heated melt in the ink reservoir. Examples of suitable antioxidants include N,N'-hexamethylene bis (3,5-di-tert-butyl-4-hydroxy hydrocinnamamide) (IRGANOX® 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX® 398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-tri-fluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis (trifluoromethyl) benzoic acid (Aldrich); ethyl-2-(4-(4-(trifluoromethyl)phenoxy) phenoxy)propionate (Aldrich); tetrakis (2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD® 76, NAUGARD® 445, NAUGARD® 512, and NAUGARD® 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Synergist.

The phase change ink compositions here in optionally further comprise a synergist. Any suitable or desired synergist can be employed. In embodiments, a copper phthalocyanine derivative is employed as a synergist for improving dispersion stability of pigmented phase change inks.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

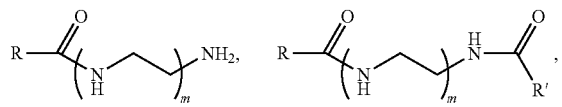

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 32000, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

The phase ink compositions can be prepared by any desired or suitable method. For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein comprises a phase change ink composition for printing on ophthalmic lenses, the phase change ink composition comprising a straight chain hydrocarbon wax and a branched hydrocarbon wax; an amide, wherein the amide is present in an amount of greater than about 25 percent by weight based on the total weight of the ink composition; a rosin ester; and a colorant; or the phase change ink composition comprising a straight chain hydrocarbon wax and a branched hydrocarbon wax; an amide, wherein the amide comprises a combination of at least two members of the group consisting of monoamide, triamide, and tetra-amide; a rosin ester; and a colorant.

A phase change ink composition is provided having a particular combination and relative ratio of selected components. In embodiments, the particular combination and relative ratio comprises a combination of both straight chain and branched hydrocarbon wax, a large amount of amide, in embodiments greater than 25 percent amide, a rosin ester, and a colorant. In embodiments, the particular combination comprises a combination of both straight chain and branched hydrocarbon wax, at least two members of the group consisting of monoamide, triamide, and tetra-amide, a rosin ester, and a colorant. In certain embodiments, a phase change ink composition herein includes a yellow dye, a blue dye, or a combination thereof, and the combination of components provided in a certain ratio as described herein. The present inventors have found that this particular combination and ratio of ingredients provides improved properties of jetting reliability, improved durability after printing on lenses, printed images on the lenses which are easy to clean and provide good adhesion on both hydrophilic and hydrophobic lenses, and good optical contrast on both clear and dark lenses.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition as described herein; melting the ink composition; and causing droplets of the melted ink to be ejected in an imagewise pattern onto a substrate.

Ink jetting temperature can be any suitable or desired jetting temperature, in embodiments, jetting temperature being from about 50° C. to about 150° C. or from about 50° C. to about 140° C. or more typically from about 100° C. to about 140° C. The ink compositions generally have melt viscosities at the jetting temperature (in one embodiment no lower than about 50° C., in another embodiment no lower than about 60° C., and in yet another embodiment no lower than about 70° C., and in one embodiment no higher than about 150° C., and in another embodiment no higher than about 145° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, in another embodiment, of greater than about $10^5$ centipoise at a temperature of less than about 40° C., in another embodiment, of less than about 15 centipoise at a temperature of no less than about 70° C., although the melt viscosity can be outside of these ranges.

In one specific embodiment, the inks are jetted at low temperatures, in particular at temperatures below about 150° C., in one embodiment from about 40° C. to about 150° C., in another embodiment from about 50° C. to about 145° C., and in yet another embodiment from about 60° C. to about 90° C., although the jetting temperature can be outside of these ranges.

In a specific embodiment, the ink compositions herein are jetted onto an ophthalmic lens. The ophthalmic lens may be coated with a hydrophilic coating or a hydrophobic coating. For example, the ink compositions herein are suitable for printing images on lenses such as those commercially available from Essilor International SA (France). The lens can be a glass or an organic ophthalmic lens. The lens can be a polymer composition lens such as injection molded polycarbonate or thermoset cast CR-39®. The lens can be coated, for example with an anti-reflective or other coating.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Examples 1-10

Inks Examples 1 through 10 were prepared having the components provided in Table 1. The inks were prepared by combining the components in the amounts shown in Table 1 in a beaker fitted with magnetic stirring and heating, heating to a temperature of about 130° C. and stirring for a period of about 2 hours. The inks were then filtered thru a 1 μm filter paper to give the desired ink. The inks of Examples 1-10 were characterized as follows.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Ink Color Component | Yellow | Yellow | Yellow | Yellow | Yellow | Yellow | Yellow | Yellow | Yellow | Blue |
| Polywax ® 655 | 22.20 | 21.62 | — | 22.03 | 22.03 | 22.03 | 22.03 | 22.03 | — | 22.20 |
| Microsere ® 5714A Wax | 41.40 | 40.33 | 63.12 | 41.09 | 41.09 | 41.09 | 41.09 | 20.55 | — | 41.40 |
| Pinecrystal ™ KE-311 | 15.20 | 14.75 | 15.03 | 8.00 | 27.06 | 15.03 | 35.06 | 15.03 | — | 15.20 |
| Pinecrystal ™ KE-100 | — | — | — | — | — | — | — | — | 21.08 | — |
| Triamide Wax | 20.20 | 19.66 | 20.03 | 27.06 | 8.00 | 20.03 | — | 20.03 | — | 20.20 |
| Kemamide ® S-180 | — | — | — | — | — | — | — | 20.54 | 44.25 | — |
| Unirez ® 2970 | — | — | — | — | — | — | — | — | 24.61 | — |
| Santicizer ® 278 | — | — | — | — | — | — | — | — | 8.04 | — |

TABLE 1-continued

| | Example | | | | | | | | | |
|---|---|---|---|---|---|---|---|---|---|---|
| | 1 | 2 | 3 | 4 | 5 | 6 | 7 | 8 | 9 | 10 |
| Naugard ® 445 | — | — | — | — | — | — | — | — | 0.2 | — |
| Yellow Dye | 1.00 | 3.64 | 1.82 | 1.82 | 1.82 | — | 1.82 | 1.82 | 1.82 | — |
| SY 43 | — | — | — | — | — | 1.82 | — | — | — | — |
| Keyplast ® Blue SB 104 | — | — | — | — | — | — | — | — | — | 1.00 |
| TOTAL (weight percent) | 100 | 100 | 100 | 100 | 100 | 100 | 100 | 100 | 100 | 100 |

Polywax® 655 is a hydrocarbon based wax that is a homopolymer of polyethylene (Mn about 655) of the general formula

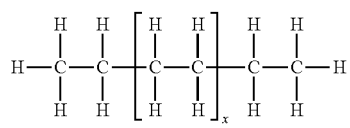

wherein x is an integer of from 1 to 200, commercially available from Baker Petrolite.

Microsere® 5714A Wax is a microcrystalline wax commercially available from Alfa Chemicals Ltd.

Pinecrystal™ KE-311 is a triglyceride of hydrogenated abietic (rosin) acid commercially available from Arakawa Chemical Industries, Ltd.

Pinecrystal™ KE-100 is an ester of tetrahydroabietic acid and glycerol commercially available from Arakawa Chemical Industries, Ltd.

A triamide wax prepared as described in Example II of U.S. Pat. No. 6,860,930, is prepared as follows. To a 1,000 milliliter four-neck round bottom flask fitted with a Trubore stirrer, $N_2$ inlet, Dean-Stark trap with condenser and N2 outlet and thermocouple-temperature controller was added 350.62 grams (0.3675 moles) of UNICID® 550 (a monoacid obtained from Baker-Petrolite Corp., Cincinnati, Ohio, of the formula $CH_3(CH_2)_nCOOH$, wherein n has an average value of about 37 and is believed to have a range of from about 34 to about 40) and 0.79 grams of NAUGARD® 524 (Chemtura Corporation). The mixture was heated to 115° C. to melt, and stirred at atmospheric pressure under N2. 51.33 grams (0.1167 moles) of JEFFAMINE® T-403 (mixture of triamines obtained from Huntsman Corporation, Houston, Tex., of the formula

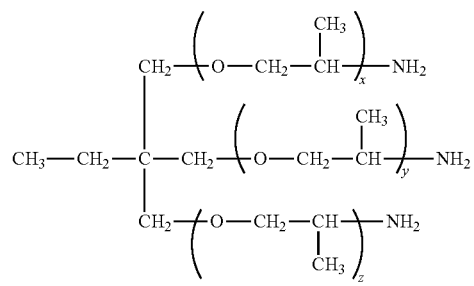

wherein x, y, and z are each integers representing the number of repeat propyleneoxy units, wherein x, y, and z may each be zero, and wherein the sum of x+y+z is from about 5 to about 6) was then added to the reaction mixture, and the reaction temperature was increased to 200° C. gradually over 0.5 hour and held at that temperature for another 3 hours. Some water was carried out by slow blowing $N_2$ and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

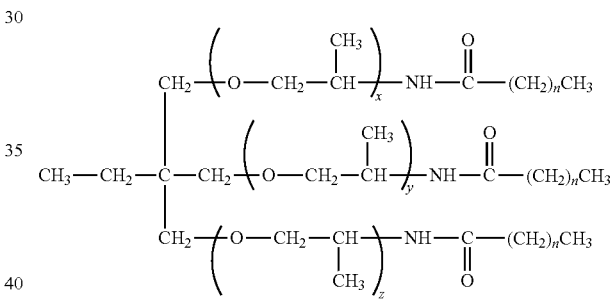

wherein n, x, y, and z are as defined hereinabove in this Example.

Kemamide® S-180 is stearyl stearamide available from Chemtura Corporation.

Unirez® 2970 is a dimer acid based tetra-amide available from Union Camp (International Paper).

Santicizer® 278 is a monomeric phthalic acid ester available from Ferro Corporation.

Naugard® 445 is an aromatic amine antioxidant, 4,4'-Bis (α, α-dimethylbenzyl) diphenylamine commercially available from Chemtura Corporation.

Yellow dye comprising a colorant of the formula

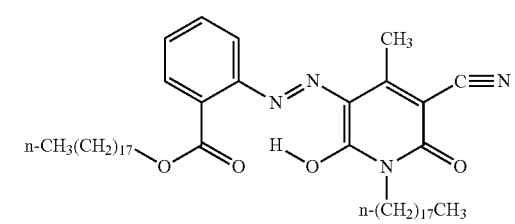

was prepared as described in Example II of U.S. Pat. No. 6,590,082, which is hereby incorporated by reference herein in its entirety. A mixture of octadecanol (270 grams, 1.0 mol; obtained from Sigma-Aldrich Co., Milwaukee, Wis.), isatoic anhydride (24 grams, 1.5 mol; obtained from Sigma-Aldrich Co.), and 1,4-diazabicyclo[2.2.2]octane (56 grams, 0.50 mol; obtained from Sigma-Aldrich Co.) in 1,000 milliliters of dimethylformamide was stirred and heated to 100° C. in a 4 liter beaker. Vigorous gas evolution occurred. After 10 minutes, the resultant brown solution was heated to 150° C. for 15 minutes. The reaction mixture was then cooled to 50° C. and vigorously stirred while 3,000 milliliters of methanol was added. The resultant suspension was stirred for 0.5 hour followed by vacuum filtration. The solid thus obtained was washed in the filter funnel with 4×300 milliliter portions of methanol and then dried in air to give the product stearyl anthranilate as white power (330.5 grams, 85 percent yield).

N-stearyl pyridone was prepared as follows. Into a 2 liter flask equipped with stirrer and temperature thermostat was charged octadecylamine (stearylamine, 18.9 grams, 0.07 mol; obtained from Sigma-Aldrich Co.) followed with ethyl cyanoacetate (7.9 grams, 0.07 mol; obtained from Spectrum Chemicals, New Brunswick, N.J.). The resulting mixture was stirred and heated to 120° C. internal temperature for 1 hour. To the hot reaction mixture was then sequentially added ethyl acetoacetate (10.08 grams, 0.0775 mol; obtained from Lonza Group, Group), piperidine (11.0 grams, 0.13 mol; obtained from Sigma-Aldrich Co.), and 60 milliliters of a solvent mixture containing 5 parts by weight toluene and 1 part by weight 1,2-dimethoxyethane. The reaction proceeded at 120° C. for another 24 hours. The solvents were then removed by distillation in vacuo, and the remaining viscous liquid was carefully poured into a solution of methanol (80 milliliters), deionized water (20 milliliters), and concentrated hydrochloric acid (16 milliliters, 2.5 mol). A solid precipitate formed instantly and the slurry was vacuum filtered followed by rinsing the solid cake with 2×50 milliliter portions of 80 percent aqueous methanol. The cake thus obtained was air-dried for 24 hours to afford 24.5 grams (0.061 mol, 87 percent yield) of N-stearyl pyridine produce as light tan power.

Into a 1 liter round-bottom flask equipped with stirrer and thermometer was charged stearyl anthranilate (136.4 grams, 0.35 mol), glacial acetic acid (145 grams), dodecylbenzene sulfonic acid (16 grams; obtained from Stepan Chemicals as Biosoft® S-101, Northfield, Ill.), and distilled water (28 grams). After complete dissolution of the stearyl anthranilate, the resulting mixture was chilled in an ice bath to a temperature of 5 to 10° C. Thereafter, nitrosylsulfuric (NSA) (commercial solution containing 40 percent by weight NSA in sulfuric acid, obtained from Sigma-Aldrich Co.; 114.4 grams, 0.36 mol) was added dropwise at such a rate that the solution temperature did not exceed 15° C. This reaction resulted in formation of the corresponding diazonium salt. The residual excess NSA was then quenched by addition of sulfamic acid.

Into a 10 liter beaker fitted with mechanical stirrer was charged stearyl pyridone (201.3 grams, 0.5 mol), distilled water (4 liters), sodium hydroxide (100 grams, 2.5 mol), sodium acetate (287.18 grams, 3.5 mol), and isopropyl alcohol (2 liters). The solution was stirred well for 30 minutes. The cloudy solution was then filtered through a Whatman #4 filter paper and the filtrate was returned to the 10 liter beaker.

The cold diazonium salt solution was poured slowly into the pyridone solution, resulting in the immediate formation of a bright yellow precipitate. After stirring for 30 minutes, the precipitate was vacuum-filtered. The yellow solid was then washed extensively with distilled water by the process of re-dispersing the solid into 4 liter portions of water and filtering, repeating the process until the conductivity of the filtrate was low. The solid was then rinsed with methanol (3 liters) and dried at 40° C. to give a final dry yield of 217.2 grams (79 percent) as a bright yellow power.

SY 43 is Solvent Yellow 43 dye commercially available as Orcosolve® Fluorescent Yellow FG from Organic Dyestuffs Corporation, East Providence, R.I. 02914.

Keyplast® Blue SB 104 is a solvent blue dye commercially available from Keystone Corporation.

TABLE 2

| | Example | | | | | | | | |
|---|---|---|---|---|---|---|---|---|---|
| | 2 | 3 | 4 | 5 | 6 | 7 | 8 | 9 | 10 |
| Solvent | Toluene | Toluene | Toluene | Toluene | N-Butanol | Toluene | Toluene | Toluene | N-Butanol |
| Ink of Pre-Filtration | | | | | | | | | |
| Spectral Str. | 1992 | 992 | — | 1000 | 911 | 964 | 990 | 992 | 353 |
| Absorption Peak (nanometers) | 431 | 432 | — | 432 | 446 | 432 | 431 | 431 | 585 |
| Ink of Post-Filtration | | | | | | | | | |
| Spectral Str. | 1989 | 990 | 991 | 999 | 905 | 981 | 989 | 988 | 353 |
| Absorption Peak (nanometers) | 432 | 431 | 431 | 431 | 446 | 432 | 431 | 431 | 585 |
| Viscosity (centipoise) AR 1000 | 12.25 | 12.64 | 12.1 | 12.78 | 11.95 | 12.72 | 11.38 | 13.81 | 11.57 |
| Test Temperature (° C.) | 125 | 125 | 125 | 125 | 125 | 125 | 125 | 135 | 125 |
| DSC | | | | | | | | | |
| Peak Melting Point (° C.) | 95.7 | 50.6, 90.6 | 95.9 | 87.1 | 95.4 | 91.3 | 84.7 | 94.8 | — |

TABLE 2-continued

| | Example | | | | | | | | |
|---|---|---|---|---|---|---|---|---|---|
| | 2 | 3 | 4 | 5 | 6 | 7 | 8 | 9 | 10 |
| End Melting Point (° C.) | 99.2 | 96.0 | 99.7 | 97.8 | 98.8 | 97.6 | 101.0 | 101.0 | — |
| Peak Freezing Point (° C.) | 83.2 | 45.9, 78.9 | 84.2 | 82.4 | 82.5 | 83.9 | 75.8 | 70.6, 81.4 | — |

The viscosity properties of the material were determined at using a 50 millimeter cone and plate geometry on an AR 1000 Rheometer, obtained from Rheometrics Corporation, now TA Instruments, Inc.

DSC: Melting point was measured by Differential Scanning calorimetry using a DuPont 2100 calorimeter at a scan rate of 10° C./minute.

As shown in Table 2, good dye solubility was achieved with the inks of Examples 1-10 as illustrated by similar spectral strengths between pre-filtered inks and post-filtered inks spectral strength measurement. The inks were printed on to a coated and uncoated plastic lenses commercially available from major lens manufacturers. The inks were scored on a scale of 0 to 5, with 0 being the worst, and 5 being the best, using a subjective visual evaluation comprising observation of adhesion and ease of cleaning/removing the printed image. Results are shown in Table 3.

TABLE 3

| | Example | | | | | | | | |
|---|---|---|---|---|---|---|---|---|
| | 1 | 2 | 3 | 4 | 5 | 6 | 7 | 8 | 9 |
| Ink Color | Yellow | Yellow | Yellow | Yellow | Yellow | Yellow | Yellow | Yellow | Yellow |
| Score | 0 | 0 | 0 | 4 | 0 | 0 | 0 | 4 | 0 |

The adhesion test comprises printing an image on to the lens using the inks of Examples 1-10, putting the printed upon lens into a paper envelope, shipping the envelope through regular first class U.S. mail, opening the envelope after shipping, and observing the lens to evaluate the robustness of the printed image. For good performance, the printed image needs to remain on the lens and the shipping envelope should not scratch the ink off of the lens. As shown in Table 3, not all inks provide good performance including both good adhesion and easy removal. The inks of the present embodiments, for example, Ink 4 and Ink 8, provided good performance including both good adhesion and easy removal.

The ink compositions of the present embodiments, for example Ink 4 and Ink 8, were easily cleaned (removed) after shipping. After shipping, the information printed on the lens is read and the printed image then needs to be removed. For example the printed image can be easily removed from the lens using IPA (isopropyl alcohol) and cloth. The printed image is easily removed without leaving residual marks on the lens and without damage to the lens. Thus, the ink compositions herein having the particular combination and criticality of components meet two contradictory requirements: good adhesion of printed image to the lens and easy removal of printed image from the lens readily and without damage to the lens while also providing the features of jettability, including being jettable without clogging print heads, and jetting reliability.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition for printing on ophthalmic lenses comprising:
   a straight chain hydrocarbon wax and a branched hydrocarbon wax;
   an amide, wherein the amide is present in an amount of greater than about 25 percent by weight based on the total weight of the ink composition;
   wherein the amide comprises a combination of at least two members of the group consisting of monoamide, triamide, and tetra-amide;
   a rosin ester; and
   a colorant.

2. The phase change ink composition of claim 1, wherein the straight chain hydrocarbon wax comprises a straight chain polyethylene wax.

3. The phase change ink composition of claim 1, wherein the branched hydrocarbon wax comprises a branched polyethylene wax, a branched polymethylene wax, or a combination thereof.

4. The phase change ink composition of claim 1, wherein the amide is present in an amount of from greater than about 25 percent to about 75 percent by weight based on the total weight of the ink composition.

5. The phase change ink composition of claim 1, wherein the amide is a combination of a monoamide and a triamide.

6. The phase change ink composition of claim 1, wherein the amide is present in an amount of from about 27 to about 55 percent by weight based on the total weight of the phase change ink composition.

7. The phase change ink composition of claim 1, wherein the amide comprises a combination of monoamide and triamide present in an amount of from about 27 to about 55 percent by weight based on the total weight of the phase change ink composition.

8. The phase change ink composition of claim 1, wherein the triamide comprises a branched triamide.

9. The phase change ink composition of claim 1, wherein the rosin ester comprises glyceryl abietate.

10. The phase change ink composition of claim 1, further comprising a member of the group consisting of plasticizer, stabilizer, antioxidant, defoamer, slip and leveling agents, clarifier, viscosity modifier, adhesive, and combinations thereof.

11. The phase change ink composition of claim 1, wherein the colorant is selected from the group consisting of dyes, pigments, and combinations thereof.

12. A phase change ink composition for printing on ophthalmic lenses comprising:
a straight chain hydrocarbon wax and a branched hydrocarbon wax;
an amide, wherein the amide is a monoamide and a branched triamide, present in an amount of greater than about 25 percent by weight based on the total weight of the ink composition;
a rosin ester; and
a colorant.

13. The phase change ink composition of claim 12, wherein the straight chain hydrocarbon wax comprises a straight chain polyethylene wax.

14. The phase change ink composition of claim 12, wherein the branched hydrocarbon wax comprises a branched polyethylene wax, a branched polymethylene wax, or a combination thereof.

15. The phase change ink composition of claim 12, wherein the amide is present in a total amount of from greater than about 25 percent to about 75 percent by weight based on the total weight of the ink composition.

16. The phase change ink composition of claim 12, wherein the rosin ester comprises glyceryl abietate.

17. The phase change ink composition of claim 12, further comprising a member of the group consisting of plasticizer, stabilizer, antioxidant, defoamer, slip and leveling agents, clarifier, viscosity modifier, adhesive, and combinations thereof.

18. The phase change ink composition of claim 12, wherein the colorant is selected from the group consisting of dyes, pigments, and combinations thereof.

19. An ink jet printer stick or pellet comprising a phase change ink composition for printing on ophthalmic lenses, wherein the phase change ink composition comprises:
a straight chain hydrocarbon wax and a branched hydrocarbon wax; and an amide, wherein the amide is present in an amount of greater than about 25 percent by weight based on the total weight of the ink composition; a rosin ester; and a colorant;
wherein the amide comprises a combination of at least two members of the group consisting of monoamide, triamide, and tetra-amide; a rosin ester; and a colorant.

20. The ink jet printer stick or pellet of claim 19, wherein the phase change ink composition further comprising a member of the group consisting of plasticizer, stabilizer, antioxidant, defoamer, slip and leveling agents, clarifier, viscosity modifier, adhesive, and combinations thereof.

* * * * *